ered with respect to the molar concentration of Cu, Pb, and Zn in the slurry so that, upon reacting, soluble arsenic compounds or toxic arsenic vapors are not formed.

United States Patent [19]

Cashman

[11] Patent Number: 4,655,829
[45] Date of Patent: Apr. 7, 1987

[54] METAL RECOVERY PROCESS

[75] Inventor: Joseph B. Cashman, King County, Wash.

[73] Assignee: CSS Management Corp., Baring, Wash.

[21] Appl. No.: 776,981

[22] Filed: Sep. 11, 1985

Related U.S. Application Data

[63] Continuation of Ser. No. 607,010, May 3, 1984, abandoned.

[51] Int. Cl.$^4$ .................................................. C22B 3/00
[52] U.S. Cl. ................................... 75/101 R; 75/114; 75/117; 75/118 R; 75/119; 75/120; 75/121; 75/2; 423/27; 423/35; 423/38; 423/39; 423/98; 423/104; 423/109; 423/87; 423/40; 423/46; 423/150; 423/602
[58] Field of Search ................. 423/27, 35, 38, 39, 423/98, 104, 109, 87, 602, 40, 46, 150; 75/101 R, 114, 117, 118 R, 119, 120, 121, 2

[56] References Cited

U.S. PATENT DOCUMENTS

| 1,011,562 | 12/1911 | Bradley | 423/35 |
| 3,981,962 | 9/1976 | Smyres et al. | 423/87 |
| 4,053,305 | 10/1977 | Smyres et al. | 75/118 R |
| 4,113,471 | 9/1978 | Langhorst et al. | 75/114 |
| 4,410,496 | 10/1983 | Smyres et al. | 423/98 |

OTHER PUBLICATIONS

Smyres and Hill, Treatment of Complex Sulfide Concentrates by the Chloride-Oxygen Approach, 1980 Pacific Northwest Metals & Minerals Conference.

Primary Examiner—John Doll
Assistant Examiner—Robert L. Stoll
Attorney, Agent, or Firm—John C. Hammar

[57] ABSTRACT

Metal values are separated from arsenic sulfide ores in a hydrometallurgical oxidation process using a balanced reactant slurry. The molar concentration of As and Sb in the reactant slurry is controlled with respect to the molar concentration of Cu, Pb, and Zn in the slurry so that, upon reacting, soluble arsenic compounds or toxic arsenic vapors are not formed.

27 Claims, No Drawings

METAL RECOVERY PROCESS

REFERENCE TO RELATED APPLICATIONS

This application is a continuation of Ser. No. 607,010, filed May 3, 1984, now abandoned.

DESCRIPTION

1. Technical Field

A hydrometallurgical process extracts metal values, such as gold, silver, cobalt, and platinum, from an arsenic sulfide ore without forming soluble or toxic arsenic compounds.

2. Background Art

Many processes are known for extracting metal values from ores, but most form toxic arsenic compounds with arsenic sulfide ores. The only commercial process presently available roasts the arsenic sulfide ore and condenses toxic $As_2O_3$. Hydrometallurgical prior art processes form $AsCl_3$, which is extremely poisonous.

In U.S. Pat. No. 4,410,496 (incorporated by reference), Smyres et al. disclose a hydrometallurgical oxidation process for ores using oxygen with an excess of $CaCl_2$ or $BaCl_2$ to form soluble metal compounds. An earlier patent, U.S. Pat. No. 4,053,305, describes another hydrometallurgical oxidation process using $FeCl_2$. These processes are ineffective with arsenic sulfide ores because they form $AsCl_3$ or other soluble arsenic compounds. Either the product solution is extremely toxic (complicating any recovery process involving the solution) or the resulting waste products create insurmountable waste disposal problems.

In the April 1983 edition of the *Engineering and Mining Journal*, at page 39 ff., a gold recovery process of Arseno Processing, Ltd., is described. This three-stage process includes concentrate leaching, gold recovery, and arsenic precipitation. The process intentionally creates arsenic solutions.

In U.S. Pat. No. 1,011,562, recovery of copper from a calcium chloride solution is described. The waste products, such as gangue and suspended particles, are insoluble, and are separated from the metal values by dissolution. Method claim 87 covers a method for separating copper from an arsenic-copper ore, but the specification contains no supporting discussion to enable use of the method.

Other methods for treating ores are described in U.S. Pat. No. 1,736,659; 3,981,962; 4,013,456; and 4,113,471. Precipitation of metal values from waste streams is discussed in U.S. Pat. Nos. 4,104,784 and 3,740,331.

DISCLOSURE OF INVENTION

Arsenic sulfide ores are treated in a hydrometallurgical process involving oxidation of the ore in the presence of excess calcium chloride by balancing the total molar metal content of arsenic and antimony with the total metal molar content of copper, lead, and zinc. In this way, the reaction occurs without the formation of soluble arsenic compounds or the evolution of toxic arsenic vapors. A bulk sulfide concentrate is prepared from the arsenic sulfide ore. This concentrate includes many desired metal values such as gold, silver, cobalt, copper, platinum, palladium, lead, and zinc. The concentrate is slurried in excess calcium chloride solution. Once the concentrate is prepared, the total metal content and composition of the concentrate is determined. The concentrate is then blended with a balancing solution slurry containing a predetermined concentration of copper, lead, zinc, or a mixture thereof, usually in the form of sulfides of those metals. The concentrate and the balancing solution slurry form a reaction slurry having a predetermined metal content such that the molar concentration of arsenic and antimony in the mixture is about equal to the molar concentration of copper, lead, and zinc. The range for the balanced mixture is usually between about 60–40 or 40–60, with fine tuning on an experimental basis necessary for particular ores due to their chemical complexity. If properly balanced, the reaction is conducted by heating the slurry to about 90° C. and aerating the heated slurry to oxidize the metal values to soluble components while eliminating the antimony and arsenic as solid wastes. No soluble arsenic compounds or toxic arsenic vapors are created. The liquid solution that is formed is separated from the solid waste and is treated to extract the desired metal values. Generally, the reaction is accelerated by maintaining the pH of the aerated reaction slurry at a pH no greater than about 3.0. Also, the temperature of the reaction of slurry is usually maintained below about 120° C.

BEST MODE FOR CARRYING OUT THE INVENTION

Arsenic sulfide ore is crushed and ground to a maximum grain size of about 100 ANSI mesh in a ball mill. The ground ore is then treated by floatation to produce a bulk sulfide concentrate. This concentrate generally contains sulfides of arsenic, antimony, copper, lead, cobalt, zinc, iron, gold, silver, platinum, and palladium.

The bulk sulfide concentrate is mixed and reground in a ball mill with a calcium chloride solution containing excess calcium chloride to complete the chemical reaction of the desired metal values. The ball mill discharge is pumped into an arsenic storage conditioning tank where the total metal content of the slurry is determined so that a careful blending or balancing of the metal values can be obtained.

Copper sulfide concentrates from high copper sulfide ores are ground in a ball mill with a calcium chloride solution and are pumped in a copper slurry storage conditioning tank. The total metal content of this slurry is determined so that this balancing solution slurry may be added to the bulk sulfide concentrate to provide the desired reaction slurry. Lead sulfide or zinc sulfide concentrates may be used in place of copper sulfide concentrates, but copper sulfide concentrate is highly preferred, because lead produces filtering problems in later stages of the process and zinc is uneconomical in comparison with copper.

The bulk sulfide concentrate and the balancing solution slurry are blended and mixed together until the total molar metal content of arsenic and antimony approximately equals the total molar metal content of copper, lead, and zinc in the resulting reaction slurry. Then the reaction slurry is balanced so that toxic arsenic compounds will not be formed. In some circumstances, the ratio of the molar concentration of arsenic and antimony to the molar concentration of copper, lead, and zinc may be as great as 60–40 or as little as 40–60. With particular ores, some experimental adjustment must be made due to the complex chemistry of the ores and their rates of reaction and dissolution.

The balanced reaction slurry is then placed in a titanium jacketed reactor and is heated with steam to about 90° C. when oxygen or compressed air is introduced into the reactor at a pressure of between about 50–70 PSIG. The resulting reaction creates heat so the reactor is cooled with water to maintain the temperature at less than about 120° C. When a reaction is completed based upon oxygen consumption, the resulting product solution is separated from the waste solid.

To enhance the rate of reaction, the pH of the reaction slurry is maintained at or below a pH of 3.0 by sequential additions of hydrochloric acid, as necessary. The reaction slurry is a natural acid, so HCl additions may be unnecessary.

Arsenic, antimony, calcium, iron, sulfur, aluminum, and silica remain as waste solids, while the desired metal values enter solution and leave the reactor as solution chlorides. When a properly balanced mixture of arsenic and antimony to copper, zinc, and lead is used, no arsenic or iron will be in the product solution and no arsenic vapors will be created. The resulting waste solid containing the arsenic and antimony is insoluble, inert, and nontoxic. The solids are acceptable under EPA leaching tests and can be placed in environmentally approved waste disposal settling ponds.

Several methods may be used to separate the desired metal values from the product solution. Platinum, palladium, gold, and silver are usually precipitated from the solution by adding finely powdered copper metal. Following the precipitation, copper values are precipitated from the solution by adding calcium carbonate. Finally, lead, cobalt, and zinc metal values are precipitated from the solution by the addition of calcium oxide and hydrogen sulfide at predetermined pH ranges. The remaining solution contains essentially calcium chloride, and this solution can be recycled to the ball mill for reuse in the process. The only makeup reactants for the process are the arsenic sulfide ores, hydrochloride acid, compressed air, calcium carbonate, calcium oxide, powdered copper metal, and hydrogen sulfide.

The process is probably best understood by reference to the following examples and tables.

EXAMPLE 1

Bus Stop concentrate and Anaconda flue dust were mixed on a 50/50 basis, slurried in calcium chloride solution, and aerated with compressed air at 50 psi in a reactor at a temperature of about 100° C.

| Analysis of | | | | | | | | |
|---|---|---|---|---|---|---|---|---|
| (a) Bus Stop Concentrates | | | | | | | | |
| Percentages (on wt. analysis) | | | | | | | Oz/ton | |
| Cu | Zn | Pb | As | Sb | Fe | Au | Ag | Pd |
| .44 | .45 | .37 | 5.8 | .28 | 16.3 | .30 | 1.9 | .10 |
| (b) Anacanada Flue Dust (copper sulfide concentrate) | | | | | | | | |
| Percentages | | | | | | | Oz/ton | |
| Cu | Zn | Pb | As | Sb | Fe | Au | Ag | Pd |
| 13.6 | 2.4 | 4.3 | 12.1 | .32 | 18.1 | .08 | 11.7 | .60 |
| Results of run | | | | | | | | |
| Ratio Bus Stop to Flue Dust 50/50 | | | | | pH = 2.15 | | | |
| Extractions (percentage in solution) | | | | | | | | |
| Cu | Zn | Pb | As | Sb | Fe | Au | Ag | Pd |

| -continued | | | | | | | | |
|---|---|---|---|---|---|---|---|---|
| Analysis of | | | | | | | | |
| 84.7 | 63.7 | 44.4 | .0 | .0 | .02 | 68.2 | 100 | 100 |

Through blending, the desired metal values were separated from the arsenic, antimony, and iron without forming toxic arsenic compounds.

TABLE 1

Analysis of Arsenic Bearing Materials, wt. percent

| | Bus Stop Conc | Anaconda Flue Dust, Cp-742 | Apex Vein Ore | Copper Conc. CP-739 |
|---|---|---|---|---|
| As | 5.8 | 12.9 | 19.1 | 1.77 |
| Sb | 0.28 | 0.41 | 1.05 | — |
| Fe | 16.3 | 18.4 | 20.5 | 16.2 |
| Cu | 0.44 | 14.1 | 0.46 | 28.3 |
| Pb | 0.37 | 4.9 | 0.89 | 0.33 |
| Zn | 0.45 | 2.8 | 0.21 | 7.5 |
| Cd | — | 0.23 | — | — |
| Bi | 0.04 | 0.57 | — | — |
| [1]Au | 0.30 | 0.07 | 2.05 | 0.09 |
| [1]Ag | 1.9 | 11.2 | 25.4 | 10.1 |
| $SO_4$ | — | 2.0 | — | — |
| $S^=$ | — | 46.3 | 13.0 | 33.4 |
| $S°$ | — | 1.4 | — | — |

[1]oz/ton

These ores of Table 1 were used in metal recovery tests outlined in Tables 2a, 2b, 3a, and 3b. The proportions of the ores are given in Tables 2a and 3a, while the recovery is shown in Tables 2b and 3b. Tests 4–10 in Table 2b show that arsenic and antimony did not enter the solution. Test 8 in Table 3b was the only successful test with the ore mixtures of Table 3a.

Additional tests were conducted using the ores of Table 4 in the proportions indicated in Tables 5 and 6. Those tests having no arsenic or antimony in solution are considered successful. Other tests show inadequate blends.

Table 6 shows that, when Bus Stop ore and Anaconda flue dust were mixed in the appropriate ratios, essentially all of the copper, zinc, lead, gold, and silver were extracted from the ore into liquid solution, while the arsenic and antimony remain as insoluble, nontoxic solid waste products.

Instead of blending naturally occurring ores to achieve the desired ratio of As and Sb to Cu, Pb, and Zn, copper, lead, or zinc sulfide solutions in known concentrations can be added to provide the blending. Greater reproducibility is achieved with a balancing solution slurry because its chemistry is precisely known, but the preparation costs of this mixture are much greater. If two natural ores can be blended, the most economical recovery can be achieved.

While preferred embodiments of the present invention have been described, those skilled in the art will readily recognize modifications and alterations of the process which might be made without departing from its inventive concept. In this regard, the claims should be interpreted liberally in light of this description and should not be limited to the preferred embodiments unless such limitation is necessary in view of the pertinent prior art.

TABLE 2

| Extraction Tests on Bus Stop Concentrate | | | | | | | | | | | | | |
|---|---|---|---|---|---|---|---|---|---|---|---|---|---|
| Test | Concentrate, gm | | CaCl₂ | Filtrate | | Extractions, percent | | | | | | | |
| Number | Bus Stop | Cp-742 | gm | pH | mv | Cu | Pb | Zn | As | Fe | Sb | Ca | Ag | Au |
| 1 | 50 | 0 | 20 | 1.6 | 507 | 91.7 | 73.9 | 100 | 0.7 | 9.9 | 0 | 78.5 | 71 | 31 |

TABLE 2-continued

Extraction Tests on Bus Stop Concentrate

| Test Number | Concentrate, gm Bus Stop | Concentrate, gm Cp-742 | CaCl$_2$ gm | Filtrate pH | Filtrate mv | Extractions, percent Cu | Pb | Zn | As | Fe | Sb | Ca | Ag | Au |
|---|---|---|---|---|---|---|---|---|---|---|---|---|---|---|
| 2 | 40 | 10 | 25 | 0.9 | 512 | 90.2 | 41.4 | 87.5 | 0.6 | 21.4 | 0 | 60.7 | 63 | 100 |
| 3 | 25 | 25 | 25 | 2.2 | 574 | 84.7 | 44.4 | 63.7 | 0.2 | 0 | 0 | 77.2 | 100 | 68 |
| 4 | 32.5 | 17.5 | 25 | 1.0 | 559 | 88.1 | 27.4 | 62.7 | 0 | 6.7 | 0 | 68.5 | 79 | 75 |
| 5 | 30 | 20 | 26 | 1.1 | 568 | 86.9 | 26.5 | 67.4 | 0 | 3.6 | 0 | 68.3 | 81 | 74 |
| 6 | 27 | 23 | 25 | 1.5 | 555 | 84.3 | 28.5 | 60.4 | 0 | 1.2 | 0 | 73.9 | 81 | 67 |
| 7 | 30 | 20 | 25 | 1.6 | 559 | 80.5 | 30.1 | 51.7 | 0 | 1.1 | 0 | 79.3 | 74 | 71 |
| 8[1] | 27 | 23 | 25 | 2.5 | 513 | 73.7 | 23.6 | 45.1 | 0 | 0 | 0 | 81.3 | 74 | 76 |
| 9 | 20 | 30 | 50 | 3.2 | 539 | 69.2 | 79.3 | 38.4 | 0 | 0 | 0 | 93.9 | 70 | 0 |
| 10 | 82.5 lb | 82.5 lb | 110 lb | — | — | 93 | 82 | 86 | 0 | 4 | 0 | 58 | 56 | 1 |

[1] 5 gm BaS added.

TABLE 3

Extraction Tests on Apex Mine Ore

| Test Number | Concentrate, gm Apex Ore | Concentrate, gm Cp-739 | CaCl$_2$ gm | Filtrate pH | Filtrate mv | Extractions, percent Cu | Pb | Zn | As | Fe | Sb | Ca | Ag | Au |
|---|---|---|---|---|---|---|---|---|---|---|---|---|---|---|
| 1 | 25 | 25 | 20 | 1.4 | — | 92.8 | — | 92.4 | 1.6 | 6.0 | 1.9 | — | 96 | 69 |
| 2 | 25 | 30 | 20 | 0.6 | — | 92.9 | 13.9 | 99.3 | 4.8 | 5.1 | 0.6 | 20.1 | 7 | 93 |
| 3 | 20 | 30 | 20 | 0.8 | — | 91.8 | 3.3 | 99.3 | 1.7 | 2.5 | 0 | 23.1 | 96 | 98 |
| 4 | 20 | 35.5 | 20 | 1.2 | — | 92.4 | 0.9 | 99.3 | 2.1 | 1.5 | 2.3 | 24.3 | 17 | 11 |
| 5 | 15 | 35 | 20 | 1.9 | 498 | 93.1 | 0 | 99.3 | 0.8 | 1.7 | 0 | 18.9 | 1 | 56 |
| 6 | 15 | 35 | 20 | 2.0 | 463 | 93.2 | 0 | 99.1 | 2.8 | 4.6 | 3.8 | 16.5 | 95 | 73 |
| 7 | 15 | 30 | 20 | 1.6 | 478 | 93.4 | 0 | 99.4 | 5.5 | 11.9 | 0.5 | 21.1 | 84 | 59 |
| 8 | 15 | 31 | 40 | 2.7 | 455 | 83.6 | 67.1 | 99.4 | 0 | 0 | 0 | 55.5 | 73 | 21 |

TABLE 4

Analysis of Arsenic Ores

| Product | Cu | Zn | Pb | As | Sb | Fe | Bi | Au[1] | Ag[1] |
|---|---|---|---|---|---|---|---|---|---|
| Bus Stop Conc. | 0.44 | 0.45 | 0.37 | 5.8 | 0.28 | 16.3 | 400 ppm | 0.30 | 1.9 |
| Anaconda flue dust (CR-742) | 13.6 | 2.4 | 4.3 | 12.1 | .32 | 18.1 | 0.48 | .08 | 11.7 |
| Anaconda Cu conc (CP-739) | 28.3 | 7.5 | .33 | 1.77 | — | 16.2 | — | .09 | 10.1 |
| Apex Mine ore | .46 | .21 | .89 | 19.1 | 1.05 | 20.5 | — | 2.05 | 25.4 |

[1] oz/ton

TABLE 5

Results of CaCl$_2$—O$_2$ treatment of Apex Mine ore

| Apex Ore to CP-739 Ratio | Filtrate pH | Filtrate mv | Metals in solution, pct Cu | Zn | Pb | As | Sb | Fe | Bi | Ca | Au | Ag |
|---|---|---|---|---|---|---|---|---|---|---|---|---|
| 50:50 | 1.4 | — | 92.8 | 92.4 | 12.0 | 1.6 | 1.9 | 6.0 | 16 | — | 69 | 96 |
| 45:55 | .55 | — | 92.9 | 99.3 | 13.9 | 4.8 | .6 | 5.1 | — | 20.1 | 93 | 86 |
| 40:60 | .78 | — | 91.8 | 99.3 | 3.3 | 1.7 | .0 | 2.5 | 10 | 23.1 | 99 | 98 |
| 36:64 | 1.16 | — | 92.4 | 99.3 | .9 | 2.1 | 2.3 | 1.5 | — | 24.3 | 0 | 17 |
| 33:67 | 1.60 | 478 | 93.4 | 99.4 | .0 | 5.5 | .5 | 11.9 | 42 | 21.1 | 57 | 81 |
| 30:70 | 1.88 | 496 | 93.1 | 99.3 | 12.4 | .8 | .0 | 1.7 | — | 18.9 | 46 | 0 |
| 30:70 | 2.04 | 463 | 93.2 | 99.1 | .0 | 2.8 | 3.8 | 4.6 | 47 | 16.5 | 63 | 96 |
| 33:67[1] | 2.70 | 455 | 83.6 | 99.4 | 67.1 | .1 | 1.0 | .01 | — | 55.5 | 51 | 54 |

[1] Twice as much CaCl$_2$ was used in this test as compared to the other tests.

TABLE 6

Results of CaCl$_2$—O$_2$ treatment of Bus Stop concentrate

| Bus Stop to Flue Dust Ratio | Filtrate pH | Filtrate mv | Extraction, pct Cu | Zn | Pb | As | Sb | Fe | Bi | Ca | Au | Ag |
|---|---|---|---|---|---|---|---|---|---|---|---|---|
| 100:0 | 1.59 | 507 | 91.7 | 100 | 73.9 | 0.7 | 0.0 | 9.9 | — | 68.6 | 71.5 | |
| 80:20 | .90 | 512 | 90.2 | 87.5 | 41.4 | .6 | .0 | .2 | — | 100.0 | 76.8 | |
| 65:35 | 1.00 | 559 | 88.1 | 72.7 | 27.4 | .0 | .0 | 6.7 | 50 | 74.8 | 78.9 | |
| 60:40 | 1.10 | 568 | 86.7 | 67.4 | 26.5 | .0 | .0 | 3.6 | 52 | 80.7 | 19.3 | |
| 54:46 | 1.50 | 555 | 84.3 | 60.4 | 28.5 | .0 | .0 | 1.2 | 69 | 66.9 | 81.2 | |
| 50:50 | 2.15 | 574 | 84.7 | 63.7 | 44.4 | .0 | .0 | .02 | — | 68.2 | 100.0 | |
| 60:40[1] | 1.58 | 559 | 80.5 | 51.7 | 30.1 | .0 | .0 | 1.1 | 65 | 70.8 | 74.4 | |
| 54:46[1] | 2.49 | 513 | 73.7 | 45.1 | 23.6 | .01 | .0 | .0 | 55 | 75.9 | 73.8 | |

[1] 5 g BaS added to leach.

I claim:

(a) preparing a slurry of ore having a total metal content of As and Sb in a molar ratio with the total metal content of Cu, Pb, and Zn, such that the molar ratio of As and Sb to Cu, Pb and Zn is in the range of between about 60:40 to 40:60, the slurry including other metals from an arsenic sulfide ore and CaCl2 in excess of the stoichiometric ratio of the total metal content of the slurry to Cl;

(b) heating the slurry;

(c) aerating the heated slurry to form a solution of metals and a waste solid containing As, Sb, and Fe without forming any soluble As or Sb compounds;

(d) separating the solution of metals from the waste solid; and (e) extracting the metals from the solution of metals.

2. The process of claim 1 wherein the ratio of As and Sb to Cu, Pb, and Zn is about 50:50 on a molar basis.

3. The process of claim 1 wherein the slurry is heated to about 90° C.

4. The process of claim 3 wherein, during aerating, the temperature of the slurry is maintained below about 120° C.

5. The process of claim 4 wherein, during aerating, the slurry has a pH no greater than about 3.0.

6. The process of claim 1 wherein the pH is controlled at no more than about 3.0 by adding a sufficient amount of HCl to the slurry.

7. The process of claim 1 wherein the slurry is prepared by:
(a) preparing a bulk sulfide concentrate from the arsenic sulfide ore and the CaCl2;
(b) measuring the total metal content of As, Sb, Cu, Pb, and Zn in the concentrate;
(c) preparing a second solution containing CuS, PbS, and ZnS;
(d) measuring the total metal content of Cu, Pb, and Zn in the second solution; and
(e) mixing the bulk sulfide concentrate with the second solution to form the slurry.

8. The process of claim 7 wherein Au, Pd, Pt, and Ag are precipitated from the solution of metals during the extraction step by adding powdered Cu to the solution of metals.

9. The process of claim 8 wherein Cu is precipitated from the solution of metals after the precipitation of Au, Pd, Pt, and Ag by adding CaCO3 to the solution of metals.

10. The process of claim 4 wherein the step of aerating occurs at a pressure of about 50-70 psig.

11. A hydrometallurgical process for separating metals from an arsenic sulfide ore without forming soluble arsenic compounds or toxic arsenic vapors, comprising the steps of:
(a) preparing a bulk sulfide concentrate from an arsenic sulfide ore containing at least one metal selected from the group consisting of Au, Ag, Co, Pd, Pt, or Zn, the concentrate also including CaCl2;
(b) measuring the metal content and composition of the concentrate;
(c) preparing a solution slurry containing any or all of CuS, PbS, and ZnS;
(d) mixing the concentrate and the solution slurry to form a reaction slurry having a metal content such that the molar concentration of As and Sb to that of Cu, Pb, and Zn is in the range that, upon oxidizing the reaction slurry, no soluble arsenic compounds and no toxic arsenic vapors are formed;
(e) heating the reaction slurry to about 90 degrees C.;
(f) oxidizing the slurry by aerating the heated slurry;
(g) separating a product solution formed during step (f) from a waste solid, the waste solid containing all of the As and Sb; and
(h) separating metals from the product solution.

12. The process of claim 11 wherein the ratio of the concentration of As and Sb to the concentration of Cu, Pb and Zn is in the range of between about 60:40 and 40:60 on a molar basis.

13. The process of claim 12 wherein the ratio is about 50:50 on a molar basis.

14. The process of claim 11 wherein the aerating forms insoluble As and Sb compounds and soluble chloride compounds of the desired metal values.

15. The process of claim 11 wherein the bulk sulfide concentrate is prepared by crushing the arsenic sulfide ore to a grain size of less than about 100 ANSI mesh, and regrinding the ore with an excess of CaCl2 solution.

16. The process of claim 11 wherein the separating of the metals includes the steps of:
(a) adding powdered Cu to the product solution to precipitate Pt, Pd, Au, and Ag from the product solution;
(b) adding CaCO3 to the product solution to precipitate Cu; and
(c) adding CaO and H2S to the product solution to precipitate Pb, Co, and Zn to create a CaCl2 solution.

17. The process of claim 11 wherein, during the aerating step, the pH of the reaction slurry is maintained below about 3.0.

18. A hydrometallurgical oxidation process for separating metals from iron, arsenic, and antimony in arsenic sulfide ores without forming soluble arsenic compounds or toxic arsenic vapors, in the presence of CaCl2 at elevated temperatures and pressures, the process comprising the steps of:
preparing a reaction slurry having a ratio of the molar metal content of As and Sb to the molar metal content of Cu, Pb, and Zn in the range of about 60:40 to 40:60; and
extracting the metals from the reaction slurry.

19. The process of claim 18 wherein the ratio is about 50:50 on a molar basis.

20. The process of claim 18 wherein the reaction slurry includes at least about 5 wt % As.

21. A hydrometallurgical process for treating arsenic sulfide ores to recover metals in the ores, the metals being selected from the group consisting of Pd, Pt, Pb, Co, Cu, Au, Ag, Zn, or mixtures thereof, the process comprising the steps of:
(a) preparing a bulk sulfide concentrate from the ore by grinding the ore and slurrying the ground ore with CaCl2 and water;
(b) measuring the total metal content of the concentrate;
(c) blending the concentrate with a copper sulfide concentrate prepared from a natural ore in solution with CaCl2, the blended product being a reaction mixture having a molar concentration of As and Sb to Cu, Pb, and Zn of between about 60:40 to 40:60;
(d) heating the reaction mixture to about 90 degrees C.; and
(e) aerating the heated mixture at an elevated pressure to react the ore to form an insoluble solid containing the As and Sb and a solution of metals, the reaction occurring without the formation of any soluble As or Sb compounds.

22. The process of claim 21 wherein the reaction mixture is catalyzed with sufficient amounts of HCl to maintain the pH at about pH 3.0 or less and is cooled to keep the temperature below about 120° C., and the process further comprises the steps of:
(a) separating the solution from the solid;
(b) adding powdered Cu to the solution to precipitate Pd, Pt, Au, and Ag from the solution;
(c) adding $CaCO_3$ to the solution to precipitate Cu from the solution;
(d) adding CaO and $H_2S$ to the solution to precipitate Pb, Co, and Zn from the solution to form a $CaCl_2$ solution; and
(e) recycling at least some of the $CaCl_2$ solution for use in preparing the bulk sulfide concentrate.

23. A hydrometallurgical process for the separation of metals from As and Sb in an arsenic sulfide ore without forming any soluble arsenic compounds or any toxic arsenic vapors, comprising the steps of:
(a) preparing a slurry of the ore having a molar concentration of As and Sb to Cu, Pb, and Zn in the ratio from about 60:40 to 40:60, the slurry containing other metals from the ore and $CaCl_2$; and
(b) aerating the slurry to form a metal solution and a waste solid containing the As and Sb without forming any soluble As or Sb compounds.

24. A hydrometallurgical process for separating metals from an arsenic sulfide ore without forming soluble arsenic compounds or toxic arsenic vapors, comprising the steps of:
(a) preparing a slurry of ore having a total metal content of As and Sb in a molar ratio with the total metal content of Cu, Pb, and Zn, such that the molar ratio of As and Sb to Cu, Pb, and Zn is in the range of between about 60:40 to 40:60, the slurry including other metals from an arsenic sulfide ore and $CaCl_2$ in excess of the stoichiometric ratio of the total metal content of the slurry to Cl;
(b) heating the slurry; and
(c) aerating the heated slurry to form a solution of metals and a waste solid containing As, Sb, and Fe without forming any soluble As or Sb compounds.

25. A hydrometallurgical process for separating metals from an arsenic sulfide ore without forming soluble arsenic compounds or toxic arsenic vapors, comprising the step of:
aerating a heated slurry of an arsenic sulfide ore containing As, Fe, Ca, Cl and at least one of Cu, Pb, or Zn to form a solution of the Cu, Pb, or Zn and a waste solid containing a calcium iron arsenate without forming soluble arsenic compounds or toxic arsenic vapors.

26. The process of claim 25 wherein the aerating occurs at an elevated temperature and pressure and wherein the pH of the slurry is no greater than about 3.0.

27. The process of claim 25 wherein the ore includes at least one metal selected from the group consisting of Au, Ag, Pd, Pt, or Co.

* * * * *

UNITED STATES PATENT AND TRADEMARK OFFICE
CERTIFICATE OF CORRECTION

PATENT NO. : 4,655,829
DATED : April 7, 1987
INVENTOR(S) : Joseph B. Cashman

It is certified that error appears in the above-identified patent and that said Letters Patent are hereby corrected as shown below:

At column 7, line 1, please insert -- 1. A hydrometallurgical process for separating metal values from an arsenic sulfide ore without forming soluble arsenic compounds or toxic arsenic vapors, comprising the steps of: --

Signed and Sealed this

Eighth Day of September, 1987

Attest:

DONALD J. QUIGG

Attesting Officer

Commissioner of Patents and Trademarks